C. H. HARVEY.
MEANS FOR SUPPORTING ELECTRODES IN IONIC TUBES.
APPLICATION FILED MAY 7, 1918.
1,389,351.
Patented Aug. 30, 1921.
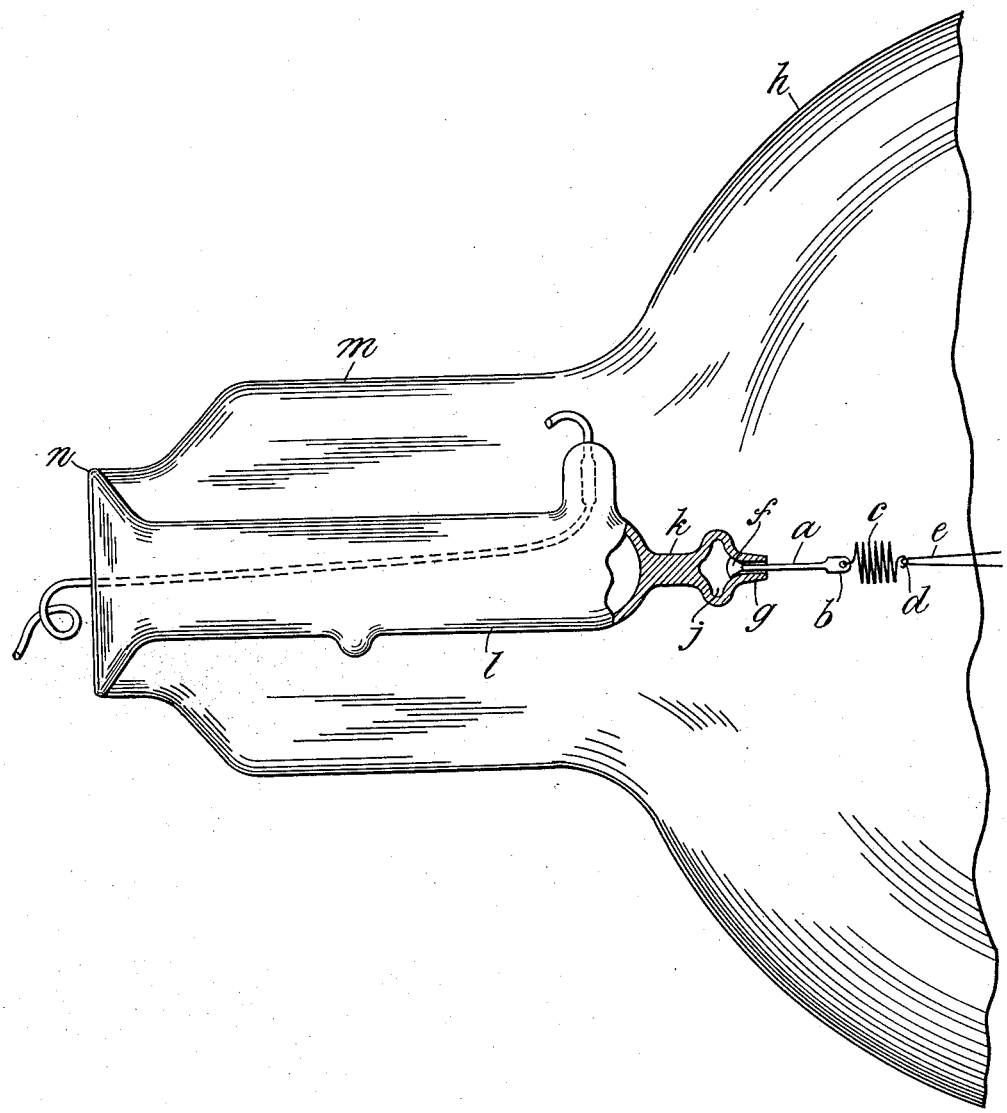

UNITED STATES PATENT OFFICE.

LULA B. HAWKINS, OF COUNCIL BLUFFS, IOWA.

BREAD-RAISER.

1,389,352.  Specification of Letters Patent.  Patented Aug. 30, 1921.

Application filed July 13, 1920. Serial No. 395,882.

*To all whom it may concern:*

Be it known that LULA B. HAWKINS, a citizen of the United States, residing at Council Bluffs, in the county of Pottawattamie and State of Iowa, has invented certain new and useful Improvements in Bread-Raisers, of which the following is a specification, reference being had therein to the accompanying drawing.

The invention relates to bread raisers and has for its object to provide a device of this character wherein a water chamber is disposed around the bread raising compartment, in which water chamber hot water may be placed, so that a uniform temperature may be maintained for a considerable length of time so as to insure the proper raising of the bread.

A further object is to provide a cylindrical shaped dough raiser formed in two semicircular sections having their ends closed and to provide a water chamber in each semicircular section for the reception of hot water, said chambers which receive the water extending entirely around the dough raising chamber when the sections are in closed position. Also to provide filling openings in the sections, through which openings water may be placed in the water chambers and to provide draining means for the water chambers.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the bread raiser.

Fig. 2 is a longitudinal vertical sectional view through the bread raiser.

Fig. 3 is a transverse vertical sectional view taken on line 3—3 of Fig. 1.

Referring to the drawings, the numeral 1 designates a cylindrically shaped member having a bread raising chamber 2 therein. Member 1 is formed from semi-circular sections 3 and 4, which are hingedly connected together as at 5, so that access may be had to the interior for placing dough therein to be raised. The ends of the semi-circular sections 3 and 4, and the sides of said sections are provided with communicating water chambers 6, in which chambers hot water is placed through the filling openings 7 and 8, so that a uniform temperature will be maintained in the chamber 2, thereby insuring the proper raising of the dough. It has been found that hot water will radiate sufficient heat for a sufficient length of time to properly raise the dough within the chamber 2.

Member 1 is supported on the base 9 by means of brackets 10, which are secured to the base, said base being preferably rectangular shaped as shown and forms means whereby the bread raiser as a whole may be disposed on a table or any other place desired.

Access is had to the chamber 2 by raising the section 3 on its hinging point. When it is desired to drain the water from the water chambers 6, it will only be necessary to open the drain cocks 11.

From the above it will be seen that a bread raiser is provided which is simple in construction and one wherein a substantially uniform heat will be maintained within the dough raising compartment, so as to insure proper raising of the dough.

The invention having been set forth what is claimed as new and useful is:—

A dough raiser comprising a cylindrical body member, said cylindrical body member being formed from two semi-circular sections longitudinally hinged together, a water chamber extending around the outer and end walls of the semi-circular section thereby forming a water chamber extending around the entire body member and ends thereof when the semicircular sections are closed, means for supplying water to the water chambers of each section, means for draining water from the water chambers of each section and a supporting base for supporting the cylindrical body member.

In testimony whereof I hereunto affix my signature.

LULA B. HAWKINS.